United States Patent
Fujimoto et al.

(10) Patent No.: US 7,245,058 B2
(45) Date of Patent: Jul. 17, 2007

(54) VIBRATION WAVE DRIVING APPARATUS, AND METHOD OF SETTING SHAPE OF SUPPORT MEMBER SUPPORTING ELASTIC MEMBER FORMING VIBRATION MEMBER OF VIBRATION WAVE DRIVING APPARATUS

(75) Inventors: Kosuke Fujimoto, Kanagawa (JP); Shinji Yamamoto, Kanagawa (JP); Mitsuo Nishimura, Kanagawa (JP); Takao Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 115 days.

(21) Appl. No.: 10/307,926

(22) Filed: Dec. 3, 2002

(65) Prior Publication Data

US 2003/0107299 A1 Jun. 12, 2003

(30) Foreign Application Priority Data

Dec. 7, 2001 (JP) .................................. 2001-373654

(51) Int. Cl.
*H02N 2/00* (2006.01)

(52) U.S. Cl. ............ 310/317; 310/323.03; 310/323.04; 310/323.06; 310/323.08

(58) Field of Classification Search .................. 310/323, 310/316, 317, 328
See application file for complete search history.

(56) References Cited

U.S. PATENT DOCUMENTS

| | | | | |
|---|---|---|---|---|
| 5,061,882 A | * | 10/1991 | Takagi | 310/316.02 |
| 5,173,623 A | * | 12/1992 | Chau et al. | 326/110 |
| 5,300,850 A | | 4/1994 | Okumura et al. | 310/323 |
| 5,376,855 A | * | 12/1994 | Suganuma | 310/316.02 |
| 5,484,216 A | | 1/1996 | Kimura et al. | 400/319 |
| 5,612,598 A | * | 3/1997 | Fukui et al. | 310/316.02 |
| 5,646,469 A | | 7/1997 | Tsukimoto et al. | 310/323 |
| 5,684,353 A | | 11/1997 | Fujimoto et al. | 310/323 |
| 5,739,623 A | | 4/1998 | Kanazawa et al. | 310/323 |
| 5,760,529 A | | 6/1998 | Tamai et al. | 310/323 |

(Continued)

FOREIGN PATENT DOCUMENTS

| | | | |
|---|---|---|---|
| EP | 1 039 558 A1 | | 9/2000 |
| JP | 2-214477 | | 8/1990 |
| JP | 2-303374 | | 12/1990 |
| JP | 4-121071 | | 4/1992 |
| JP | 7-143765 | | 6/1995 |
| JP | 9-215348 | | 8/1997 |
| JP | 09215348 | * | 9/1997 |
| JP | 2000-261280 | | 9/2000 |

OTHER PUBLICATIONS

English translation of JP 2000–261280.

*Primary Examiner*—J. San Martin
(74) *Attorney, Agent, or Firm*—Fitzpatrick, Cella, Harper & Scinto

(57) ABSTRACT

A vibration wave driving apparatus includes a vibration member in which an electro-mechanical energy conversion element is fixed to an elastic member, and a contact member pressed against a sliding part provided in the vibration member, so as to be kept in contact therewith. The vibration wave driving apparatus is configured to supply alternating signals in a predetermined driving frequency band to the electro-mechanical energy conversion element, thereby generating a predetermined natural vibration mode in the elastic member to drive the contact member. In the apparatus, the natural vibration mode is generated in the elastic member, a natural frequency of another vibration mode different from the natural vibration mode is detected, and a stiffness of the support member is altered if the natural frequency of the other vibration mode detected is included in the driving frequency band.

15 Claims, 13 Drawing Sheets

U.S. PATENT DOCUMENTS

| | | | |
|---|---|---|---|
| 5,798,598 A | 8/1998 | Fujimoto | 310/323 |
| 5,889,350 A | 3/1999 | Yamamoto | 310/316 |
| 5,939,851 A | 8/1999 | Kataoka et al. | 318/611 |
| 5,949,178 A | 9/1999 | Tamai et al. | 310/323 |
| 6,049,156 A | 4/2000 | Yamamoto et al. | 310/316.01 |
| 6,054,795 A | 4/2000 | Yamamoto et al. | 310/316.01 |
| 6,084,334 A | 7/2000 | Yamamoto et al. | 310/316.01 |
| 6,100,622 A | 8/2000 | Yamamoto et al. | 310/316.01 |
| 6,107,723 A | 8/2000 | Fujimoto | 310/323.09 |
| 6,107,724 A | 8/2000 | Tamai et al. | 310/323.11 |
| 6,225,730 B1 | 5/2001 | Fujimoto | 310/348 |
| 6,313,564 B1 | 11/2001 | Kataoka et al. | 310/316.01 |
| 6,376,965 B1 | 4/2002 | Kataoka et al. | 310/317 |
| 2002/0053858 A1 | 5/2002 | Hayashi et al. | 310/316.01 |
| 2002/0096970 A1 | 7/2002 | Hayashi et al. | 310/316.02 |
| 2002/0121869 A1 | 9/2002 | Kataoka et al. | 318/114 |

* cited by examiner

| f [KHz] | OUT-PLANE BENDING | TORSION | IN-PLANE BENDING |
|---|---|---|---|
| 28.099 | 8 | | |
| 32.543 | | | 2 |
| 33.146 | | 5 | |
| 33.934 | 9 | | |
| 38.717 | | | 3 |
| 38.930 | | 6 | |
| 39.746 | 10 | | |

VIBRATION WAVE DRIVING APPARATUS, AND METHOD OF SETTING SHAPE OF SUPPORT MEMBER SUPPORTING ELASTIC MEMBER FORMING VIBRATION MEMBER OF VIBRATION WAVE DRIVING APPARATUS

BACKGROUND OF THE INVENTION

1. Field of the Invention

The present invention relates to a vibration wave driving apparatus equipped with a vibration member comprised of an elastic member to which an electro-mechanical energy conversion element is fixed and a contact member kept in contact with a surface of the vibration member; and configured to generate vibration in the surface of the vibration member by the electro-mechanical energy conversion element to move the contact member as a movable member relative to the vibration member.

2. Description of Related Art

The vibration wave driving apparatus, such as a vibration wave motor (ultrasonic motor) and the like, has a vibration member, which forms vibration in an elastic member of metal or the like to which an electro-mechanical energy conversion element is fixed, when alternating signals of alternating voltages or the like are supplied to the electro-mechanical energy conversion element such as a piezoelectric element or the like, and a movable member (contact member) kept in contact with the vibration member while being pressed against it; and is configured to move the movable member relative to the vibration member by the vibration formed in the vibration member. The vibration wave motors with the vibration member being fixed and the contact member being the movable member are actuators from which a large driving force can be withdrawn at low speed, and have the feature of minimal speed unevenness.

Particularly, smoother driving can be implemented by the vibration wave motors in which vibration of a travelling wave is generated in the elastic member and in which the movable member in contact with the elastic member is driven.

FIG. 15 shows a configuration of a conventional vibration wave motor. This vibration wave motor is composed of a ring-shaped elastic member 1 of metal or the like fixed to a housing 7 with screws; a movable member 4 kept in frictional engagement with the elastic member 1 through a frictional member 3; and a press spring 5 and a rotational shaft 6 for keeping the movable member 4 in press contact with the elastic member 1 and for outputting rotation of the movable member 4, respectively. The rotational shaft 6 is rotatably supported on the housing 7 by ball bearings 8. The elastic member 1 is integrally constructed of a ring-shaped vibration part 1A located in the outermost peripheral region, a support circular plate part 1B located inside of the vibration part 1A, and a flange part 1C located further inside of the support circular plate part 1B. The elastic member is made by cutting or by die forming, such as powder sintering or the like, of a metal material. The vibration member is formed by bonding a piezoelectric element to one surface of the elastic member 1 with an adhesive or the like.

FIG. 16 is a perspective view of the vibration member of the conventional vibration wave motor. A plurality of radial grooves 4 are formed in the axial direction in one plane of the ring-shaped vibration part 1A, and a composite resin material containing PTFE as a principal component is bonded as the frictional member 3 onto upper surfaces of projections 1E of comb teeth shape formed by the plurality of grooves. The frictional member 3 can be a surface-treated metal material or a ceramic material of alumina, depending upon applications.

A ring-shaped piezoelectric element 2 as an electro-mechanical energy conversion element is bonded to the other surface of the elastic member 1, i.e., the surface without the grooves, as shown in FIG. 17, and a pattern electrode 2-1 shown in FIG. 17 is formed in the piezoelectric element 2 by evaporation or by printing.

The pattern electrode 2-1 is equally divided in a number equal to four times an order of a vibration mode excited in the ring portion of the vibration member, and alternating voltages of nearly sinusoidal shape with time phases successively shifted at intervals of 90° are applied to the respective electrodes. When the alternating voltages are applied at a frequency near the natural frequency of the excited vibration mode, the elastic member resonates because of the bending moment exerted on the elastic member by expansion and contraction of the piezoelectric element 2, so that vibrations are generated corresponding to the respective alternating voltages different at intervals of 90°. These vibrations are combined to form a travelling wave. Since the exciting portions of the piezoelectric element are equally distributed in the ring-shaped vibration portion as described, the amplitude of vibration is uniformized and highly accurate driving can be maintained over a long period of time.

A technique for reducing noise, so called "squeaks," is disclosed in Japanese Patent Application Laid-Open No. 2-214477. In the case where a vibration mode different from the mode used for driving is generated as a self-excited vibration by an exciting force appearing at a contact part, dynamic stiffness is made nonuniform at positions corresponding to integral multiples of half of the wavelength of the mode, whereby natural frequencies of vibrations in the same mode are made different from each other, so as to impede production of a travelling wave. Since the exciting force due to the contact between the movable member and the vibration member acts on the contact part, squeaks can be made in some cases, but the above means can make the squeaks less prone to be generated. Grooves 4-1 in FIG. 18 are deeper than the other grooves 4 and are located at sixteen positions throughout the circumference. This makes a difference between natural frequencies of two vibrations in the eighth-order mode with nodes at the sixteen positions and makes the self-excited vibration less prone to appear as a travelling wave.

There were, however, cases where it was difficult to maintain the performance over a long period of time even by the uniformization of vibration or by the decrease of the self-excited vibration of the other mode as in the conventional configuration.

FIG. 19 provides other natural modes (the fifth-order and sixth-order torsion modes and the second-order and third-order in-plane bending modes) near the driving mode of the conventional elastic member (the ninth-order out-of-plane bending mode), and natural frequencies thereof This vibration member utilizes, for driving, the out-of-plane ninth-order mode in which the ring portion undergoes deflection in the axial direction, as in a diagram of deformation of the elastic member shown in FIG. 20. In this example, there exist the out-of-plane eighth-order mode lower in the order and the out-of-plane tenth-order mode higher in the order than the out-of-plane ninth-order mode used for driving, in the lower frequency and upper frequency regions than the frequency of the out-of-plane ninth-order mode.

Besides the out-of-plane modes, as shown in FIG. 21, there exist torsion modes in which the ring portion is alternately twisted with respect to the axis near the center of the cross section of the ring portion, and in-plane modes in which the ring portion undergoes bending vibration in the plane normal to the symmetry axis of the ring.

Since the exciting forces by the electrode pattern of the piezoelectric element shown in FIG. 17 are exerted at excitation points of nine positions equal in phase, which are arranged equally on the circumference, the exciting forces except for the ninth-order mode are canceled out and do not appear accordingly. For this reason, there are no exciting forces of the other modes near the driving frequency.

A curve "A" in FIG. 22 is a frequency response curve of vibration displacement to the frequency of the driving voltages applied to the piezoelectric element in a non-contact state of the vibration member with the movable member. Since there are no exciting forces of the other modes, no response appears in the other modes.

A curve "B" in FIG. 22 indicates a frequency response curve in the case where the frictional portion of the elastic member is excited at nine points arranged at equal intervals. In this case, similar to the case of the curve "A" the response curve includes only a response in the ninth-order mode.

On the other hand, the exciting forces on the vibration member are resultant forces of two kinds, the exciting forces from the piezoelectric element and the exciting forces from the movable member in press contact, and thus the vibration member must experience the ninth-order excitation from the piezoelectric element and the even exciting forces in the nine regions in contact with the movable member in the driving state of the movable member. Therefore, no other mode is forcedly excited in the driving state.

However, a response is different if the frictional member is uneven. Supposing the frictional member has a projection at only one point, the pressure of contact with the movable member is concentrated at one point of the projection, and the pressure is lowered at the other contact portions. The vibration member undergoes excitation at the driving frequency at the projecting point every time the travelling wave of the driving vibration passes the projecting point.

A curve "C" in FIG. 22 represents a frequency response curve in the case where the frictional portion of the vibration member is excited at one point. It is seen therefrom that there appear responses in the other modes, different from the case of equal excitation at nine points.

FIGS. 23A and 23B show responses of an out-of-plane bending mode and torsion modes as separate response curves. FIG. 23A shows the response curves in the case of a small amplitude of vibration (low rotational speed) and FIG. 23B shows the response curves in the case of a large amplitude of vibration (high rotational speed). The response curve of the out-of-plane bending ninth-order mode demonstrates such nonlinearity that the resonant frequency gradually decreases with increase of amplitude, because of change of the contact state caused by the increase of amplitude.

Since the out-of-plane bending ninth-order mode is used as the driving mode herein, excitation is induced in the driving frequency band as illustrated. At this time, the torsion fifth-order mode close to the driving mode exhibits a large response in the frequency band used for the driving. This raises a concern that in the driving state with the frictional portion being uneven, the forced excitation at the driving frequency produces the torsion fifth-order vibration and the torsion fifth-order vibration is superimposed on the out-of-plane ninth-order vibration of the driving mode.

An amplitude distribution of the vibration member was actually measured in the state of the frictional portion being uneven and the amplitude distribution obtained was that as shown in FIG. 24. This distribution has amplitude maxima at fourteen positions, because the torsion fifth-order mode is superimposed at the same frequency on the ninth-order mode.

This is because the unnecessary other mode appears in response to the driving frequency and the unwanted vibration also appears as a vibration at the driving frequency. For this reason, it never makes noise, like squeaks.

However, the vibration amplitude of the composite vibration becomes uneven, which promotes partial abrasion of the frictional portion and causes localized abrasion. With advance of localized abrasion at the fourteen positions, the clearance will expand relative to the vibration member driving in the ninth-order mode and the fifth-order mode becomes more likely to arise. This will result in further promoting the localized abrasion and end up in failure in maintaining stable contact and degrading output characteristics.

The unevenness of the frictional portion is made by flaws during production, temporary deposition of abrasion powder in the driving state, and dropping of a filler, and the exciting forces from the movable member due to the unevenness made thereby can be the exciting forces to excite the other mode at the driving frequency.

SUMMARY OF THE INVENTION

A feature of the invention in the present application is to provide a vibration wave driving apparatus in which a mode other than a driving mode, which can be forcedly excited because of unevenness of the frictional portion made in the normal use condition, is set apart from the driving frequency band to decrease the amplitude of the response therein, so as to eliminate the unevenness of vibration due to the superposition of the other mode, thereby maintaining output performance over a long period of time.

An aspect of the present invention is a vibration wave driving apparatus having a vibration member comprising an electro-mechanical energy conversion element and an elastic member, and a movable member in contact with the vibration member. The apparatus is configured to supply alternating signals in a predetermined driving frequency band to the electro-mechanical energy conversion element to generate a vibration for driving in the vibration member, wherein a natural frequency of another vibration different from the vibration for driving is not included in the driving frequency band.

Another aspect of the present invention is a method of setting a shape of a member fixed to an elastic member of a vibration member and supporting the elastic member in a vibration wave driving apparatus having the vibration member comprising an electro-mechanical energy conversion element and the elastic member; and a movable member in contact with the vibration member. The apparatus is configured to supply alternating signals in a predetermined driving frequency band to the electro-mechanical energy conversion element to generate a vibration for driving in the vibration member, wherein if a natural frequency of another vibration different from the vibration for driving is included in the driving frequency band on the occasion of generating the vibration for driving in the vibration member, a stiffness of the member supporting the elastic member is altered.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
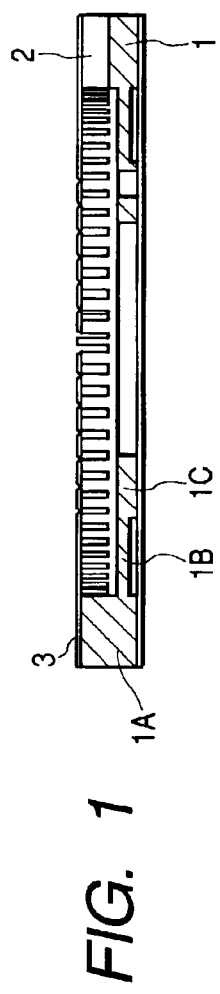
FIG. 1 is a sectional view of a vibration member according to a first embodiment.

FIG. 1 shows a vibration member according to a first embodiment of the present invention.

A plurality of grooves 2 extending in radial directions are circumferentially formed in a ring-shaped vibration part 1A of a ring-shaped elastic member 1 forming a vibration member, and a plurality of comb teeth 3 for expansion of displacement are formed between the grooves 2. A support circular plate part 1B for supporting the ringshaped vibration part 1A is integrally formed with an internal region of the ring-shaped vibration part 1A, and a flange part 1C for fixing the vibration member is integrally formed with an internal region of the support circular plate part 1B. The support circular plate part 1B also serves as a frequency adjusting part for adjusting the frequency of the vibration member.

Figure 2:
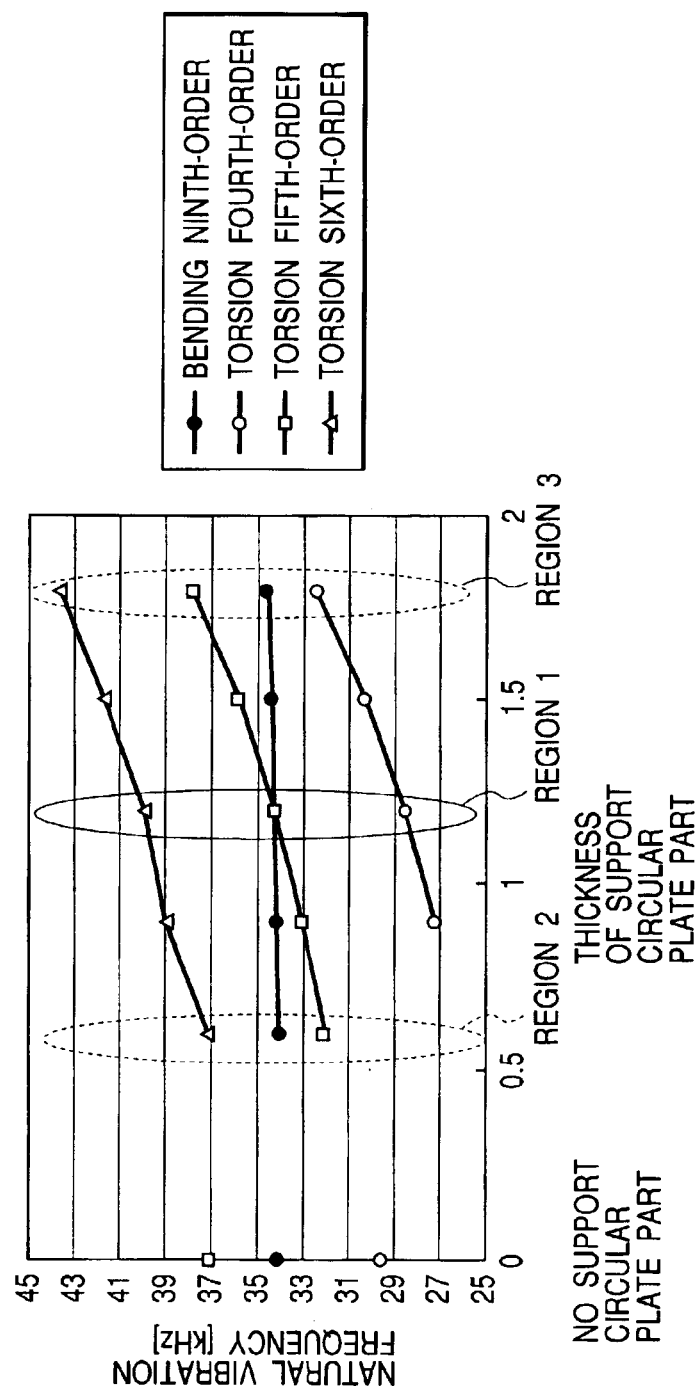
FIG. 2 is a chart showing natural frequencies of vibration members in the first embodiment.

FIG. 2 shows the natural frequencies of the driving mode and natural frequencies of torsion modes detected in a configuration without the support circular plate part 1B in the elastic member 1 and in each of configurations with different thicknesses of the support circular plate part 1B.

As shown in FIG. 2, the natural frequency of the out-of-plane bending ninth-order mode of only the ring-shaped vibration part 1A (in a state without the support circular plate part 1B and the flange part 1C) is located between the torsion fourth-order mode and the torsion fifth-order mode.

Here, the support circular plate part 1B and the flange part 1C are provided to support the vibration part 1A, and the flange part 1C is fastened with screws. The thickness of the support circular plate part 1B needs to be sufficiently thin so as not to impede the vibration of the vibration part 1A. To the contrary, if the thickness of the support circular plate part 1B is too thin, it will result in failing to effectively achieve the action of guiding heat generated in the ring part by vibration and frictional heat in the sliding part (contact part) to the outside of the vibration member, thereby preventing heating of the vibration member.

FIG. 2 shows the transition of each natural frequency with an increase in the thickness of the support circular plate part 1B.

The natural frequency of the out-of-plane bending ninth-order mode being the driving mode demonstrates little change even with increase in the thickness of the support circular plate part 1B, while the torsion modes increase their respective natural frequencies with an increase in the thickness of the support circular plate part 1B. With a change in the thickness of the support circular plate part 1B, the natural frequencies of the torsion modes change greater than natural frequency of the out-of-plane bending mode.

In a region 1 surrounded with a vertically long ellipse of a solid line in FIG. 2, the natural frequency of the out-of-plane ninth-order mode, which is the driving mode, is approximately coincident with the natural frequency of the torsion fifth-order mode. For a vibration wave motor having a support circular plate part 1B with the thickness corresponding to the region 1, there is a concern that the torsion fifth-order mode is forcedly excited by excitation at the sliding part between the vibration member and the movable member on the occasion of excitation in the driving mode.

In the present embodiment, therefore, the thickness of the support circular plate part 1B is set to a thickness corresponding to a region 2 or a region 3, which are shown with dashed-line ellipses in FIG. 2, whereby the natural frequency of the driving mode is set fully apart from the natural frequencies of the torsion modes.

Figure 3:
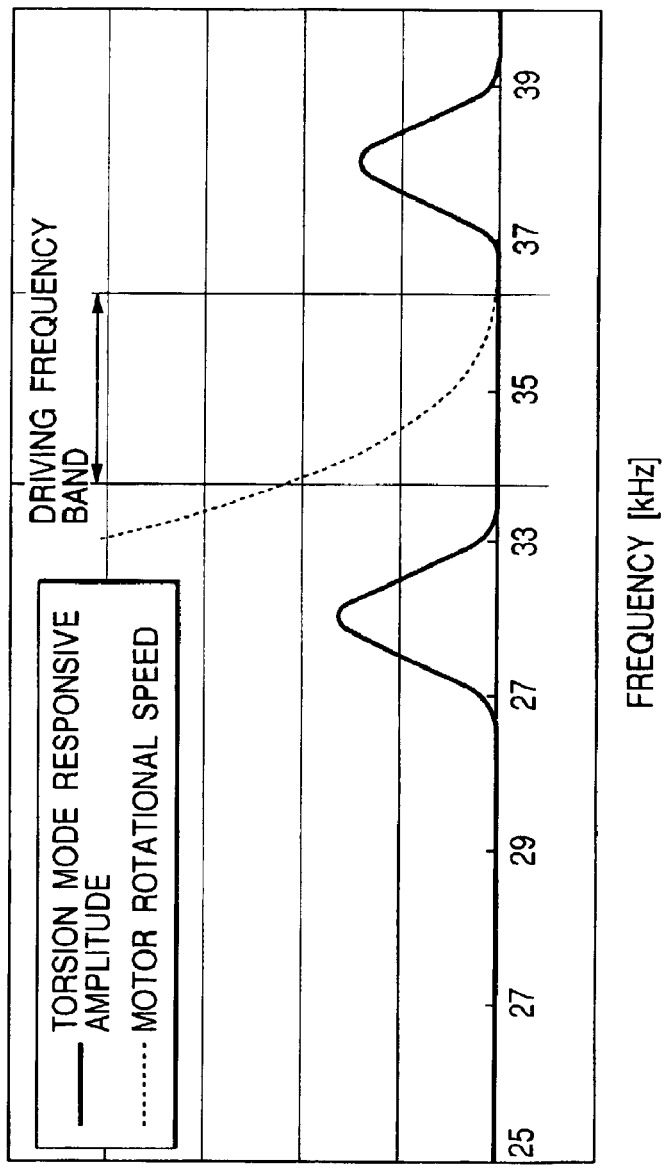
FIG. 3 is a chart showing the driving frequency band in the first embodiment.

FIG. 3 shows driving frequency-speed curves and frequency responses of torsion modes in the excitation at the sliding part. A region indicated by a double-headed arrow in the drawing represents the driving frequency band of this motor. Since the driving frequency band is set between torsion modes of different orders by properly selecting the dimensions of the thin plate region of the support circular plate part, the motor can be driven in the frequency band with no natural frequency of another torsion mode, as shown in FIG. 3.

Namely, the dynamic stiffness of the support circular plate part 1B of the vibration member is adjusted so that the natural frequencies of the modes other than the natural frequency of the driving mode become changed more than the natural frequency of the driving mode, whereby the natural frequencies of the modes other than the driving mode are prevented from being superimposed on the driving frequency band of the vibration member.

Figure 4:
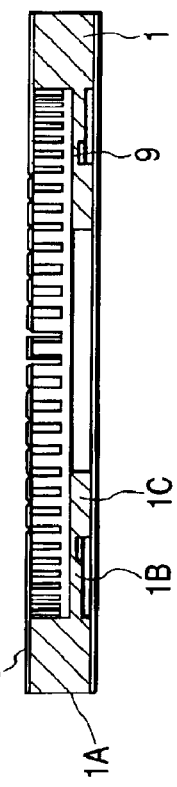
FIG. 4 is a sectional view of a vibration member according to a second embodiment.

FIG. 4 is a sectional view of a vibration member according to a second embodiment of the present invention.

In this embodiment, a thin part is provided near an internal region of the support circular plate part 1B in order to adjust the frequency of the vibration member.

During driving, the vibration part 1A increases its temperature because of heat generated by its own internal strain, heat generated by friction at the sliding part, and heat generated by the piezoelectric element. In order to secure a stable frictional force at the sliding part and prevent degradation of the bond with the piezoelectric element, it is necessary to control the rise of the temperature of the vibration part 1A in a predetermined range. An effective way to accomplish this is to transfer the heat through the support circular plate part 1B.

The heat transfer performance of the support circular plate part 1B is determined by a sectional area vertical to the radial direction from the vibration part 1A to the flange part 1C and a temperature gradient. Therefore, if the thickness of the support circular plate part 1B is decreased in order to place the other modes outside the driving frequency band, the heat transfer performance will degrade and there is a possibility of degradation of performance and breakage due to the rise of the temperature of the vibration part 1A.

In the present embodiment, therefore, a thin frequency adjusting part 9 is provided in only a portion of the support circular plate part 1B.

Figure 5:
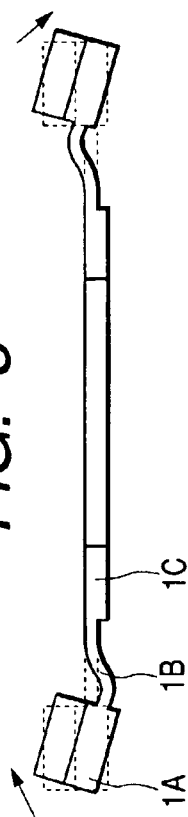
FIG. 5 is a sectional view showing a vibrating shape in a torsion mode.

FIG. 5 is a sectional view of the shape of the elastic member during torsional vibration. In FIG. 5, the inner peripheral side of the support circular plate part 1B on the flange 1C side is a fixed end, and thus has a small amplitude of vibration but large strain during vibration. Since the vibration part 1A in the outer periphery undergoes rotational displacement, the support circular plate part 1B has a maximum amplitude at a certain position, and the amplitude and strain both are large there.

On the other hand, in the case where the natural frequencies of the torsion modes are set apart from the driving frequency band by decreasing the natural frequencies of the torsion modes, an effective method is to decrease the stiffness of the vibration member by decreasing the stiffness of a portion with large strain.

However, if the stiffness is decreased by cutting away a part of the shape, the mass of that region will also decrease simultaneously. If the mass is reduced in the portion where the amplitude of vibration is large, the equivalent mass in the vibration mode will be greatly lowered to increase the natural frequency, which will result in cancelling the decrease effect of the natural frequency achieved by the decrease of stiffness. For lowering the natural frequencies of the torsion modes, therefore, an effective way is to provide the frequency adjusting part whose dynamic stiffness against torsional vibration is reduced by cutting away a part of the shape of the region where the amplitude of vibration is small and the strain is large in the torsion modes.

Figure 6:
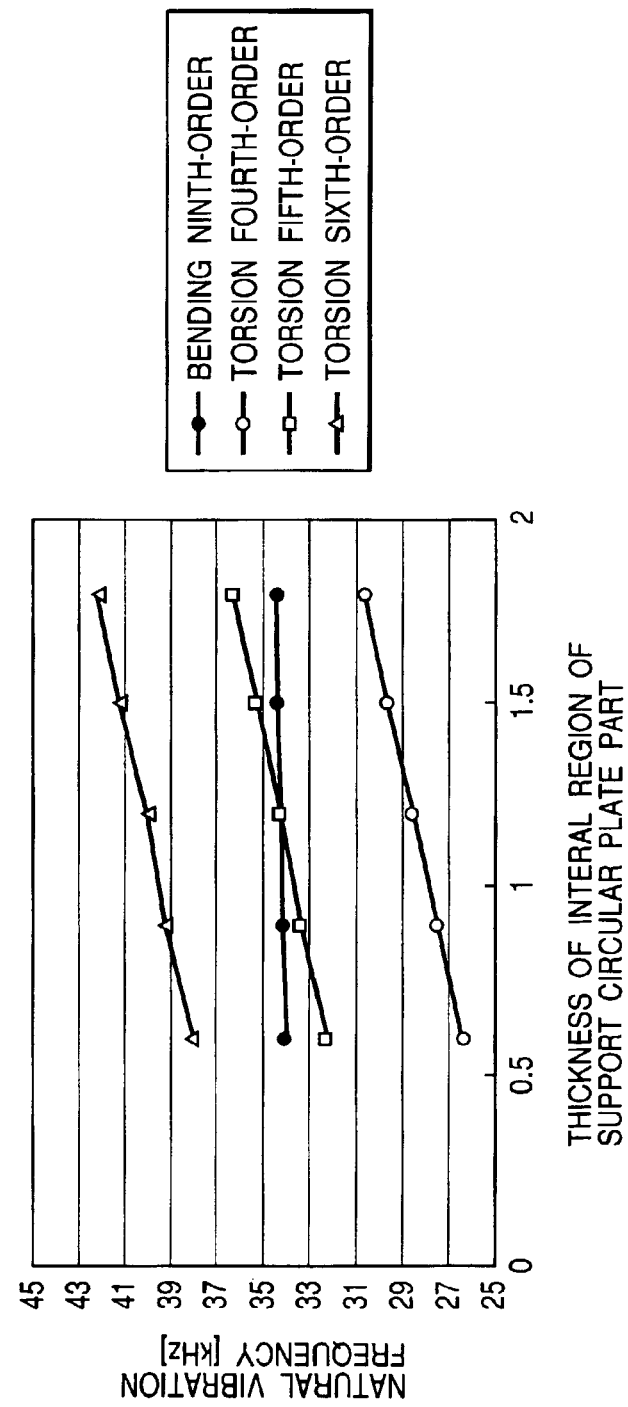
FIG. 6 is a chart showing natural frequencies of vibration members in the second embodiment.

FIG. 6 depicts the relationship between the natural frequency of the driving mode and the natural frequencies of the torsion modes in the case where a portion with low stiffness is provided in a partial region of the support circular plate part. The effect of lowering the natural frequencies is also achieved in the same level as that achieved by changing the thickness of the entire support circular plate as shown in FIG. 2. In order to transmit heat from the ring-shaped vibration part to the fixed part, the thin portion should be as narrow in width as possible, because the temperature gradient becomes larger, so as to permit a greater quantity of heat to be transmitted. In the present embodiment, therefore, the thickness of the support circular plate 1B is decreased near the innermost periphery thereof where the amplitude is small and the strain is large in the torsion modes, whereby the natural frequencies of the torsion modes are lowered without affecting the heat dissipation effect.

Figure 7:
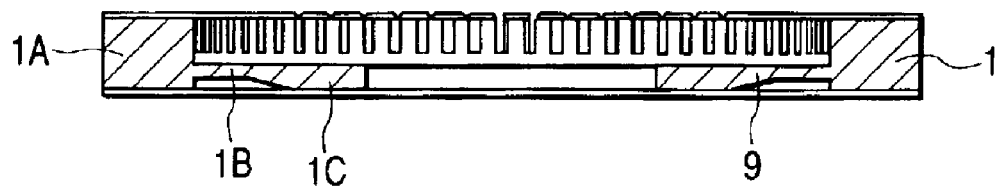
FIG. 7 is a sectional view of a vibration member according to a third embodiment.

FIG. 7 is a sectional view of a vibration member according to a third embodiment.

In this embodiment, a taper part 9, which increases in thickness toward the fixed part, is provided near the innermost periphery of the support circular plate part 1B.

In the vibration member of the present embodiment, where the inner peripheral side of the support circular plate part 1B has the same thickness as the other part, a natural frequency of a torsion mode exists near the upper region of the driving frequency band. Since an effective way in this case is to increase the natural frequency of the torsion mode, the thickness of the support circular plate 1B on the inner peripheral side where the amplitude is small and the strain is large in the torsion modes, is set larger than the thickness of the radially outside part, so as to enhance the dynamic stiffness against the torsion modes. This taper part 9 serves as a frequency adjusting part.

Furthermore, in the present embodiment the taper shape has its thickness decreasing from the largest strain part toward the outer peripheral side where the amplitude is large, whereby the frequency can be adjusted by change of a smaller region. Therefore, the influence is small on the driving mode. Although the taper shape was employed herein, the frequency adjusting part may be formed in stepwise shape with a plurality of steps.

Figure 8:
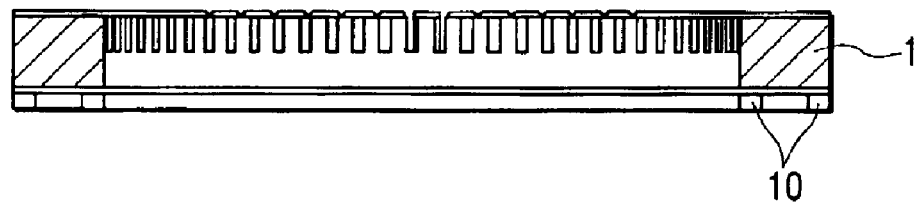
FIG. 8 is a sectional view of a vibration member according to a fourth embodiment.

FIG. 8 is a sectional view of a vibration wave motor according to a fourth embodiment.

The elastic member of this embodiment is an elastic member of ring shape without the support circular plate part and the fixed part, and is applied when the elastic member is of hollow structure to permit the space in the central region to be utilized.

The vibration member of this embodiment is supported in the axial direction by sheets 10 of an elastic material on the bottom of the elastic member. The sheets are made of a material with low viscous resistance, e.g., felt, or the like.

A ring-shaped sheet having the inside diameter and outside diameter approximately equal to those of the vibration member was used heretofore, whereas this embodiment adopts a structure in which the sheet shape is separated into the sheet on the inside diameter side and the sheet on the outside diameter side in order to expel the natural frequencies of torsional vibrations in the ring part from the driving frequency band.

If a ring-shaped sheet having the inside diameter and outside diameter approximately equal to those of the vibration member is used as before, an intermediate part of this sheet between the inside diameter and the outside diameter will be displaced in the directions normal to the sliding surface, in the case of out-of-plane bending vibration. However, this intermediate part will not be displaced in the directions normal to the sliding surface, in the case of torsional vibration, because it serves as an axis of torsion. Therefore, the stiffness of this part in the directions normal to the sliding surface affects the out-of-plane vibration, but does not affect the torsional vibration. In contrast, the stiffness of the portions of the sheet on the inside diameter side and on the outside diameter side affects both the out-of-plane vibration and the torsional vibration.

For this reason, when the shape of sheet 10 is divided into two separate parts, i.e., inside and outside, the stiffness against torsional vibration can be enhanced with little change in the stiffness against out-of-plane vibration. Namely, the felt functions as a frequency adjusting part.

Figure 9:
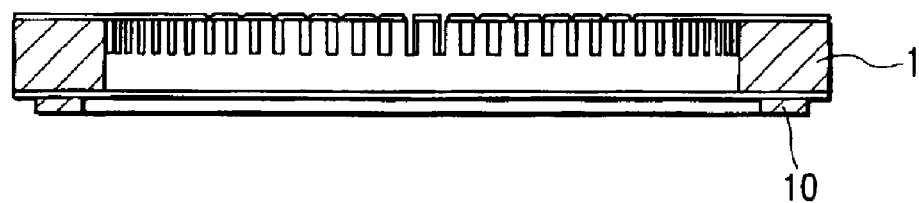
FIG. 9 is a sectional view of a vibration member of another form in the fourth embodiment.

For lowering the natural frequencies of torsional vibration, as shown in FIG. 9, the sheet 10 of felt is formed in a ring shape larger than the inside diameter of the vibration member and smaller than the outside diameter of the vibration member, and in smaller thickness to enhance the stiffness relatively, so as to keep the natural frequency of out-of-plane vibration unchanged, whereby the natural frequencies of torsional vibration can be lowered with little change in the natural frequency of out-of-plane vibration. The sheet 10 should be placed at an appropriate position on the basis of comparison between the natural frequencies in the torsion modes and the driving frequency band, as described above.

Figure 10:
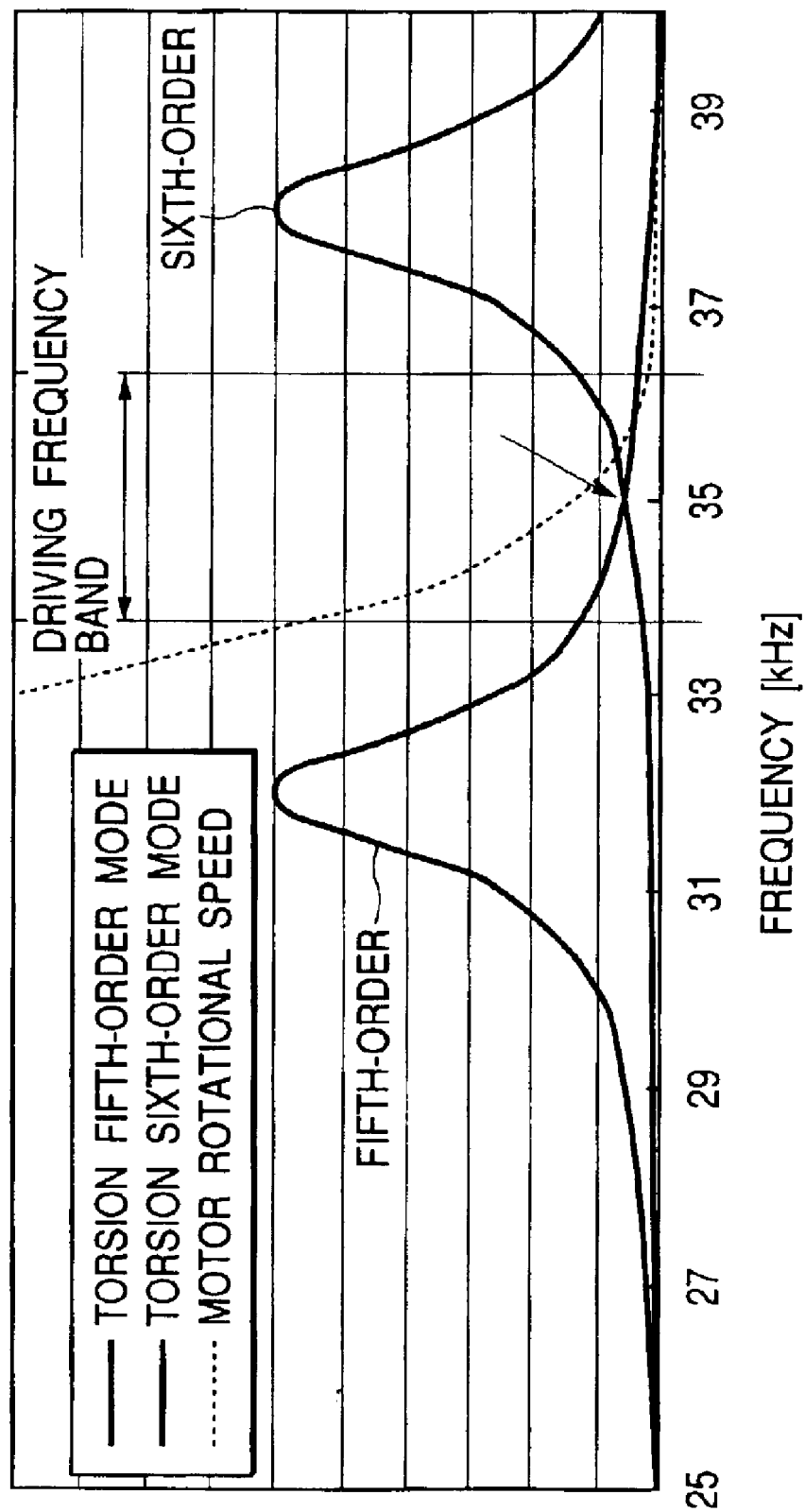
FIG. 10 is a chart showing the driving frequency band according to a fifth embodiment.

FIG. 10 is a chart showing the frequency response curves in the torsion modes and the driving frequency band of the vibration member according to a fifth embodiment.

This embodiment is configured so that the driving frequency band includes regions where frequency response gains of resonance in a torsion mode having the natural frequency higher than the driving frequency band and in a torsion mode having the natural frequency lower than the driving frequency band are equal to each other.

Even if the natural frequencies of the torsion modes are set apart from the driving frequency band, there still exist response gains of forced vibration in the torsion modes, and thus stabler driving can be implemented by driving in the region where the responses are as small as possible. However, since there exist torsion modes of plural orders, the torsion modes have their natural frequencies in the frequency band higher than the driving frequency band and in the frequency band lower than the driving frequency band. Therefore, the influence of the torsion modes is smallest in driving in the region where these response gains both are minimized as much as possible.

In the present embodiment, therefore, the driving frequency band is arranged to include a frequency where the response gains are equal in the torsion modes during excitation at the sliding part of the vibration member. It is also desirable to set the driving frequency band so that maxima of response gains in neighboring torsion modes of different orders become equal to each other in the driving frequency band. In FIG. 10, the driving frequency band is set so that the maximum of the response gain in the fifth-order torsion mode becomes equal to the maximum of the response gain in the sixth-order torsion mode in the driving frequency band.

This permits the vibration member to be driven under the condition of the minimized responses from the neighboring torsion modes of different orders.

Figure 11:
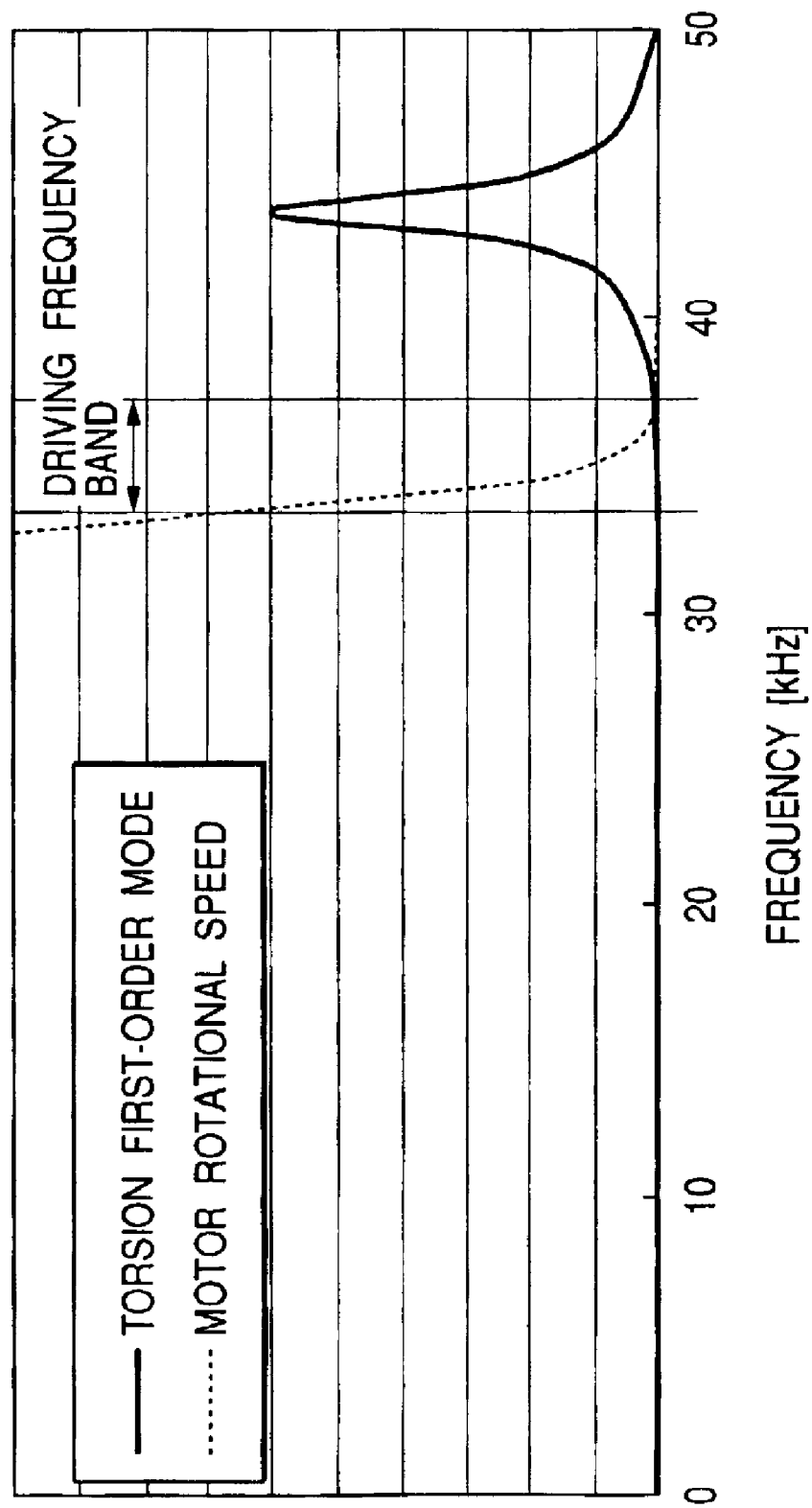
FIG. 11 is a chart showing the driving frequency band according to a sixth embodiment.

FIG. 11 is a chart showing a natural frequency of a torsion mode and the driving frequency band of a vibration member according to a sixth embodiment.

In this embodiment, the torsion mode closest to the driving frequency band is of the first order and the natural frequency of this first-order torsion mode is present in a frequency band higher than the driving frequency band.

When the first-order torsion mode is set in the frequency band higher than the driving frequency band, there exists no torsion mode in the frequency band lower than the driving frequency band and the response gain of forced vibration in the torsion mode is small, whereby it becomes easier to drive the vibration wave motor in the band.

Figure 12:
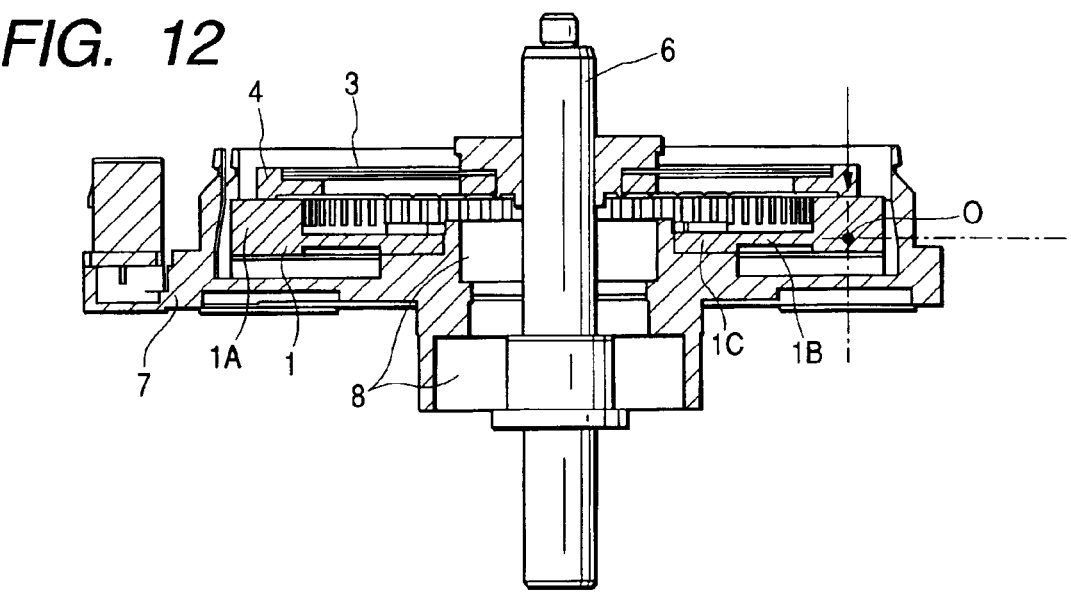
FIG. 12 is a sectional view of a vibration wave motor according to a seventh embodiment.

FIG. 12 is a sectional view of a vibration wave motor using a vibration member according to a seventh embodiment. An arrow in the drawing indicates a direction of a reaction force exerted at the sliding part on the vibration member of the present embodiment.

When the vibration member is set in contact with the movable member 4, the sliding part of the movable member 4 receives a reaction acting vertically to the sliding surface and a frictional force acting in parallel to the sliding surface. Here the contact part of the movable member 4 is constructed in such structure that it is displaced in much the same direction as the vibrating direction of the vibration member under the reaction in the vertical direction. Since the frictional force is determined by this reaction and the coefficient of friction of the sliding surface, the magnitude of the frictional force is small.

Therefore, it can be considered in the present embodiment that the force acting on the movable member is only the reaction vertical to the sliding part through the sliding part. Since the vibration member receives the reaction force vertical to the sliding part through the sliding part as a reaction force from the movable member, the exciting force to the vibration part is that as indicated by an arrow in FIG. 12.

In the present embodiment, the position of the sliding part is set so that the reaction force to the vibration member passes the center O of torsion in the torsion mode of the vibration member. When the sliding part is placed in this way, even if another exciting force to the vibration member is produced by unevenness in the sliding part, it becomes a reaction force passing the center O of torsion of the movable member 4, so as not to establish coupled forces that can twist the vibration member. Therefore, it is feasible to make the response displacement small in the torsion modes.

Figure 13:
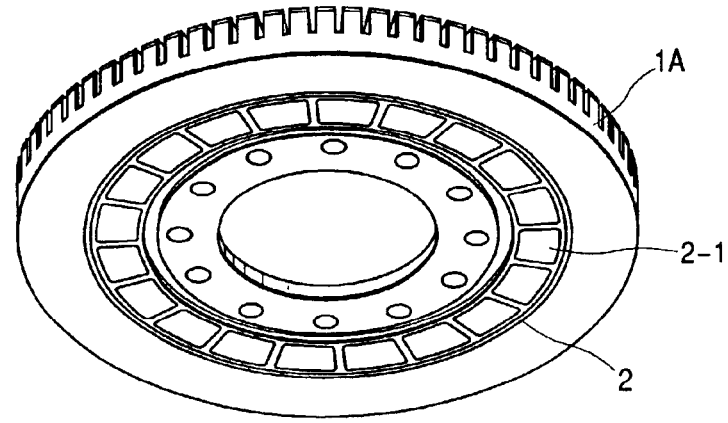
FIG. 13 is a perspective view of a vibration member according to an eighth embodiment.
Figure 14:
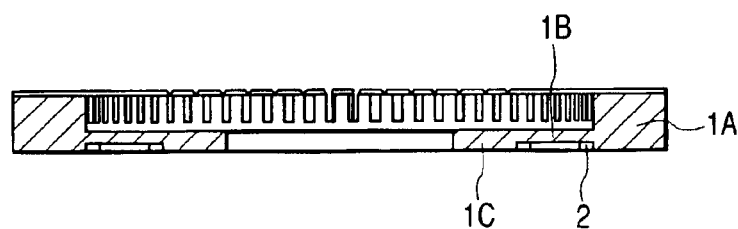
FIG. 14 is a sectional view of a vibration member in the eighth embodiment.
Figure 15:
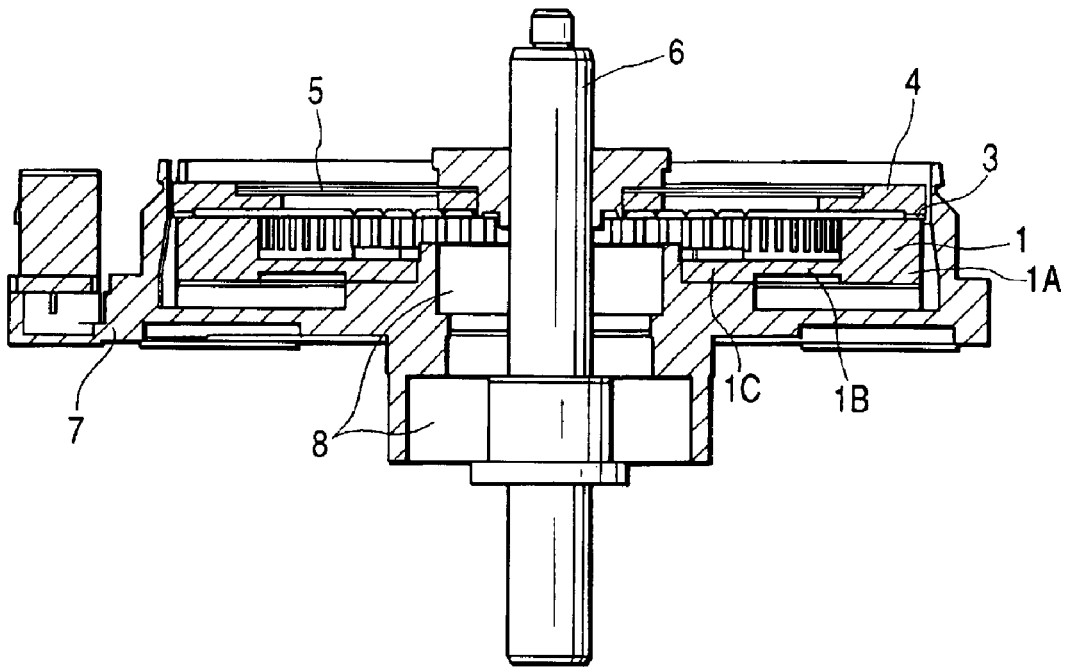
FIG. 15 is a sectional view of a conventional vibration wave motor.
Figure 16:
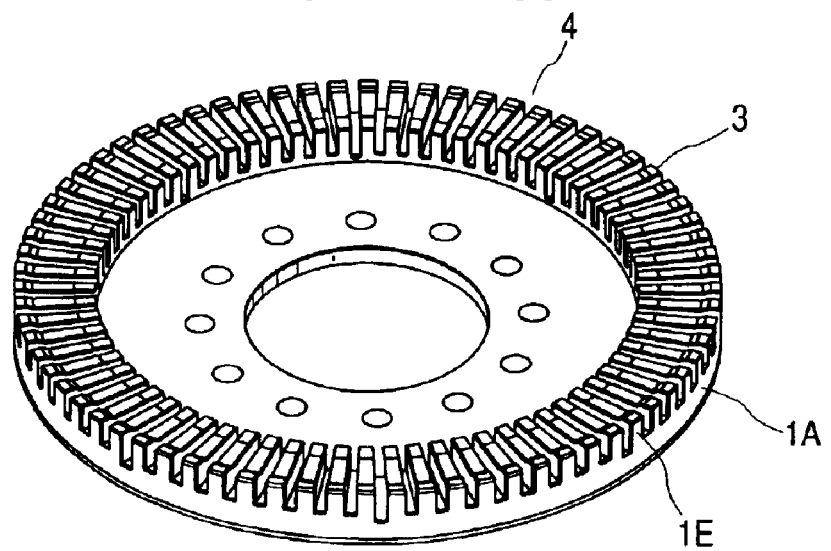
FIG. 16 is a perspective view of the conventional vibration member.
Figure 17:
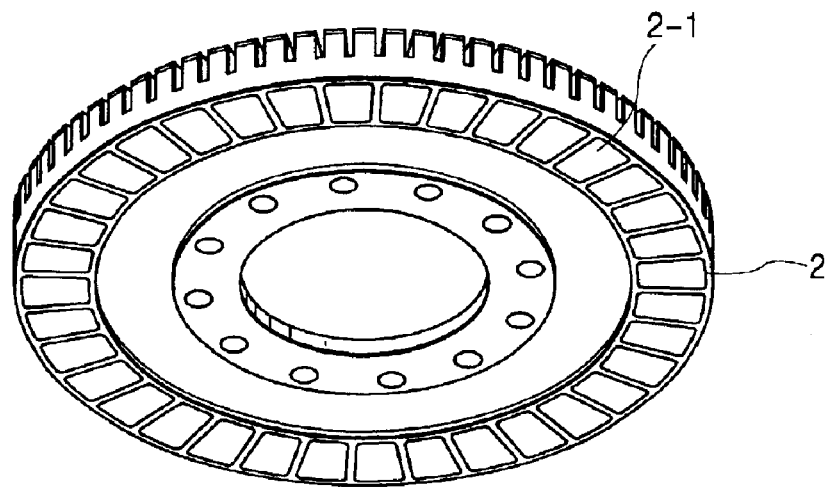
FIG. 17 is a perspective view of the conventional vibration member.
Figure 18:
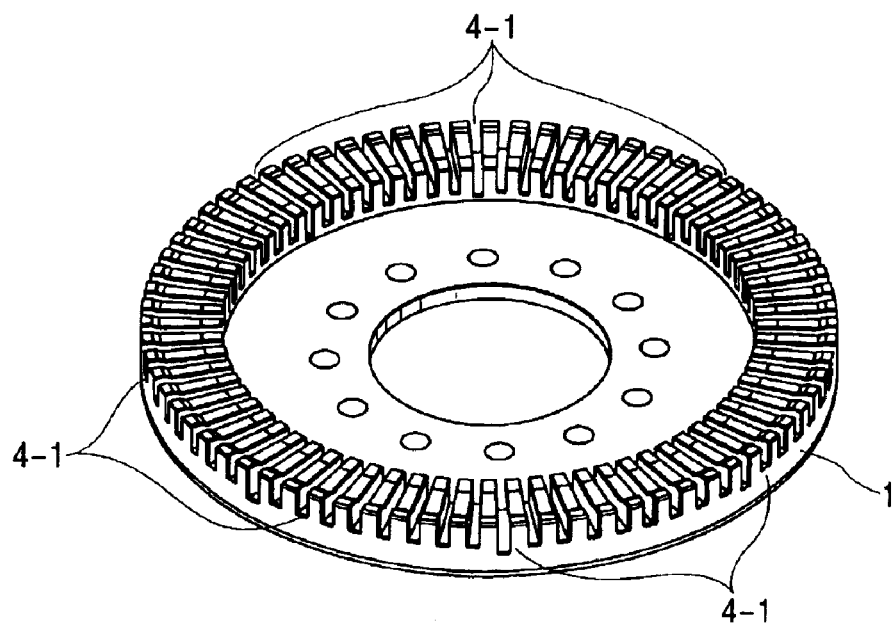
FIG. 18 is a view showing a conventional unwanted vibration reducing means.
Figures 19, 20:
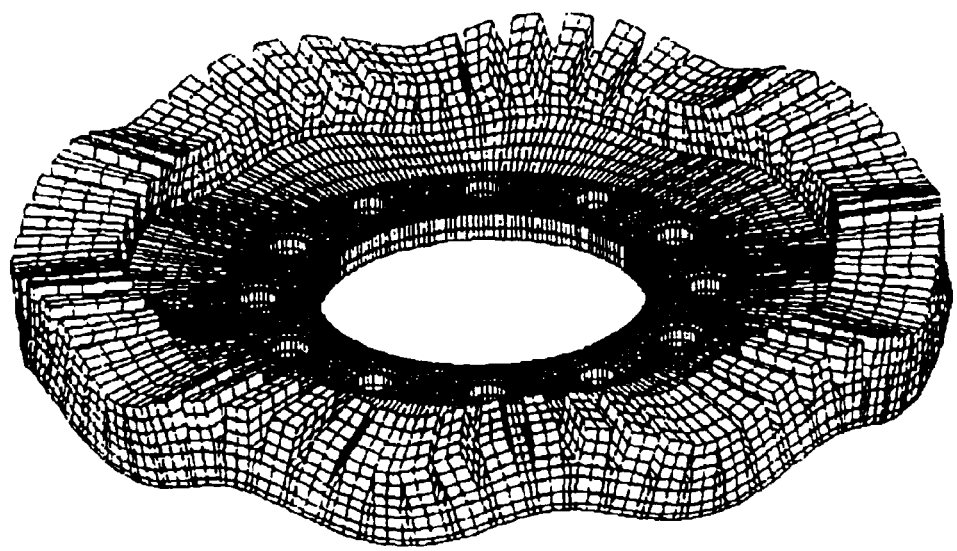
FIG. 19 is a table of natural frequencies of a conventional vibration member.
FIG. 20 is a deformation diagram in the driving mode.
Figure 21:
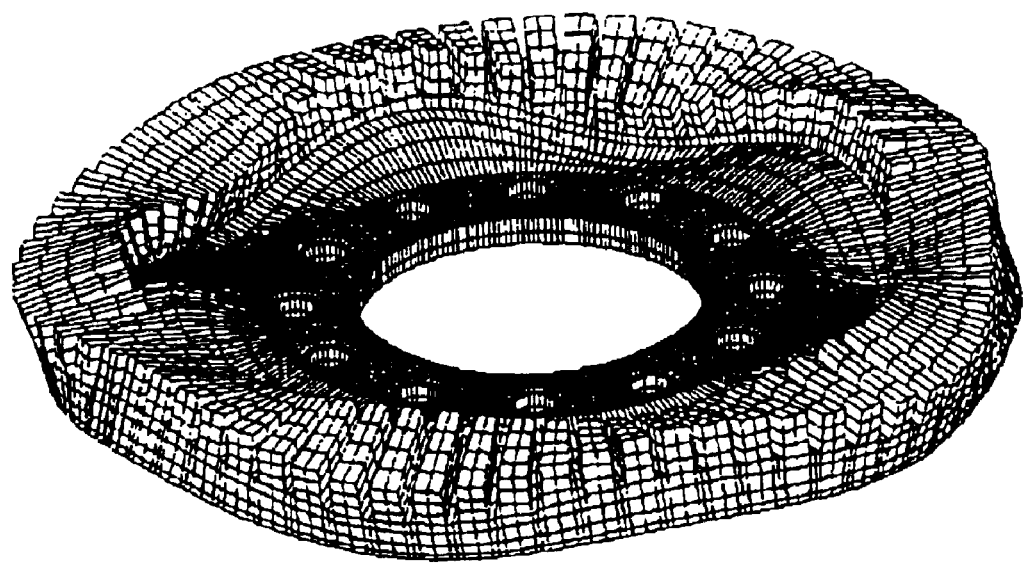
FIG. 21 is a deformation diagram in the torsion mode.
Figure 22:
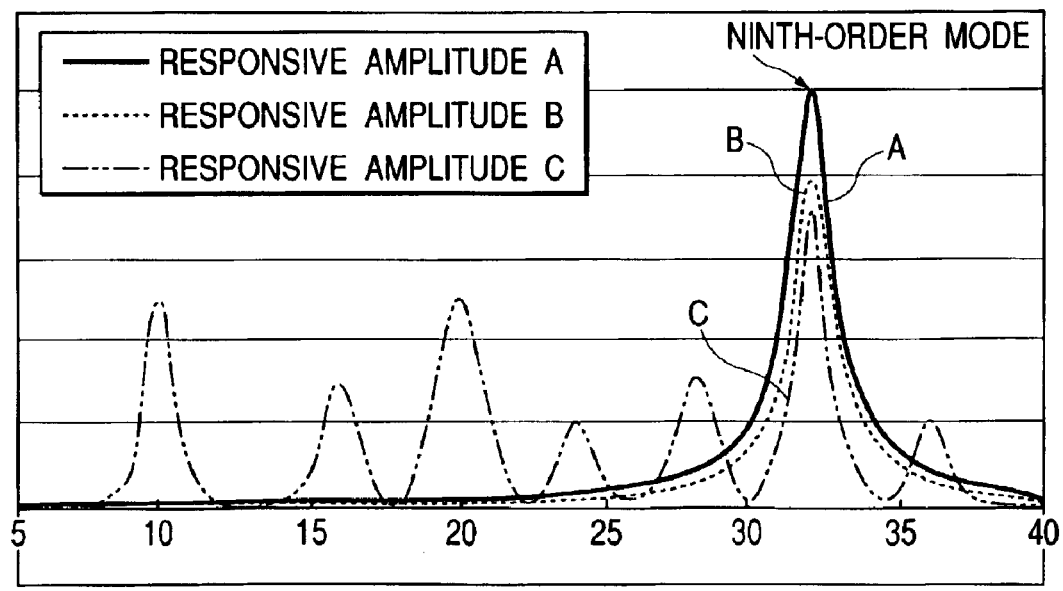
FIG. 22 is a chart showing frequency response curves of the vibration member.
Figure 23A:
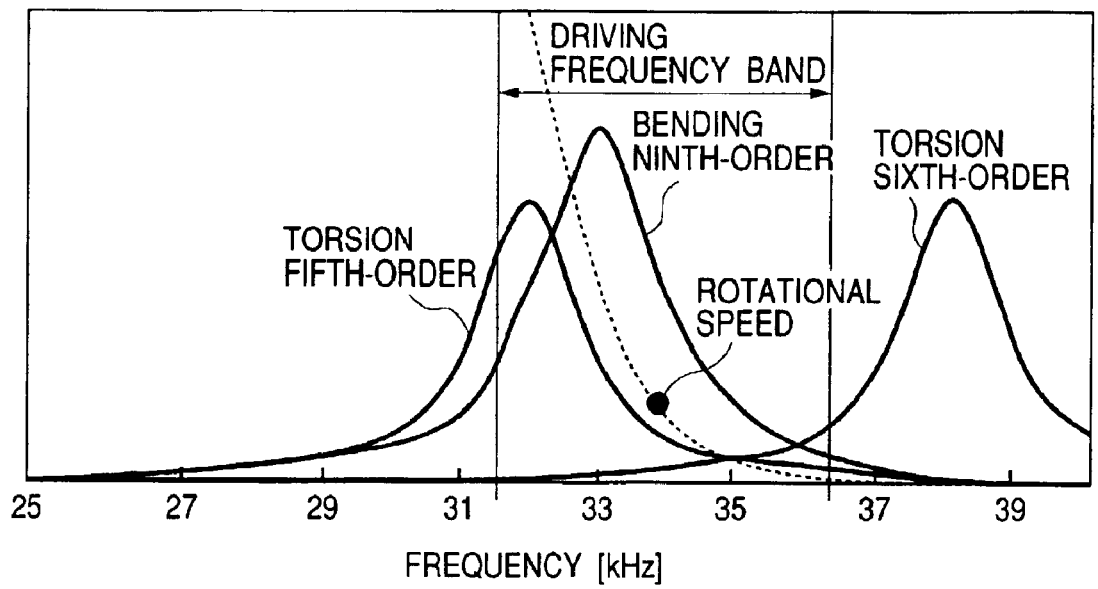
FIGS. 23A and 23B are charts showing the frequency response curves and driving frequency band of the vibration member.
Figure 23B:
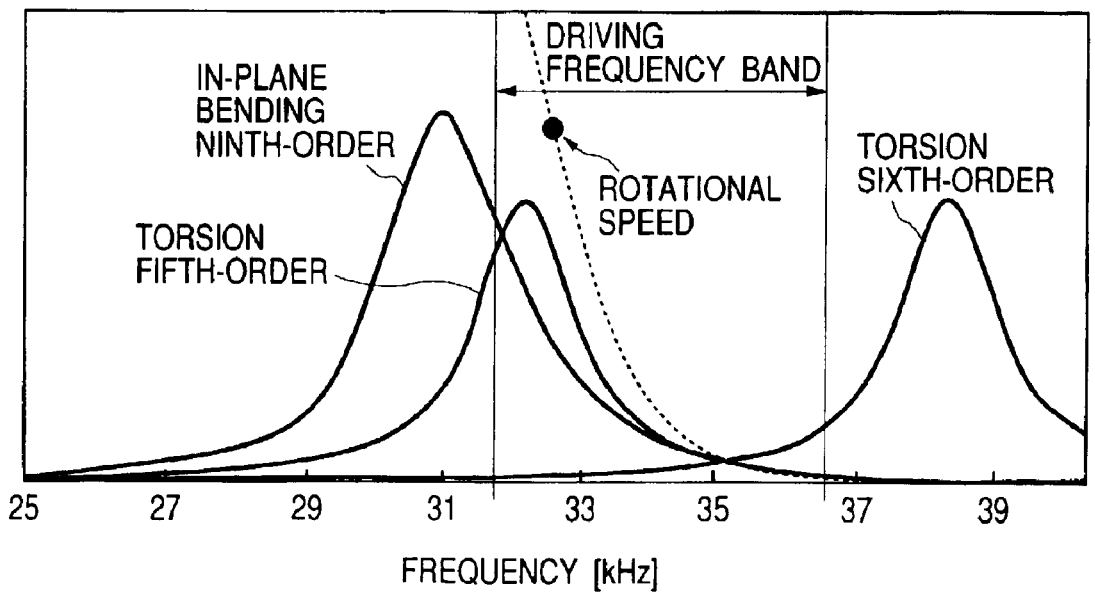
Figure 24:
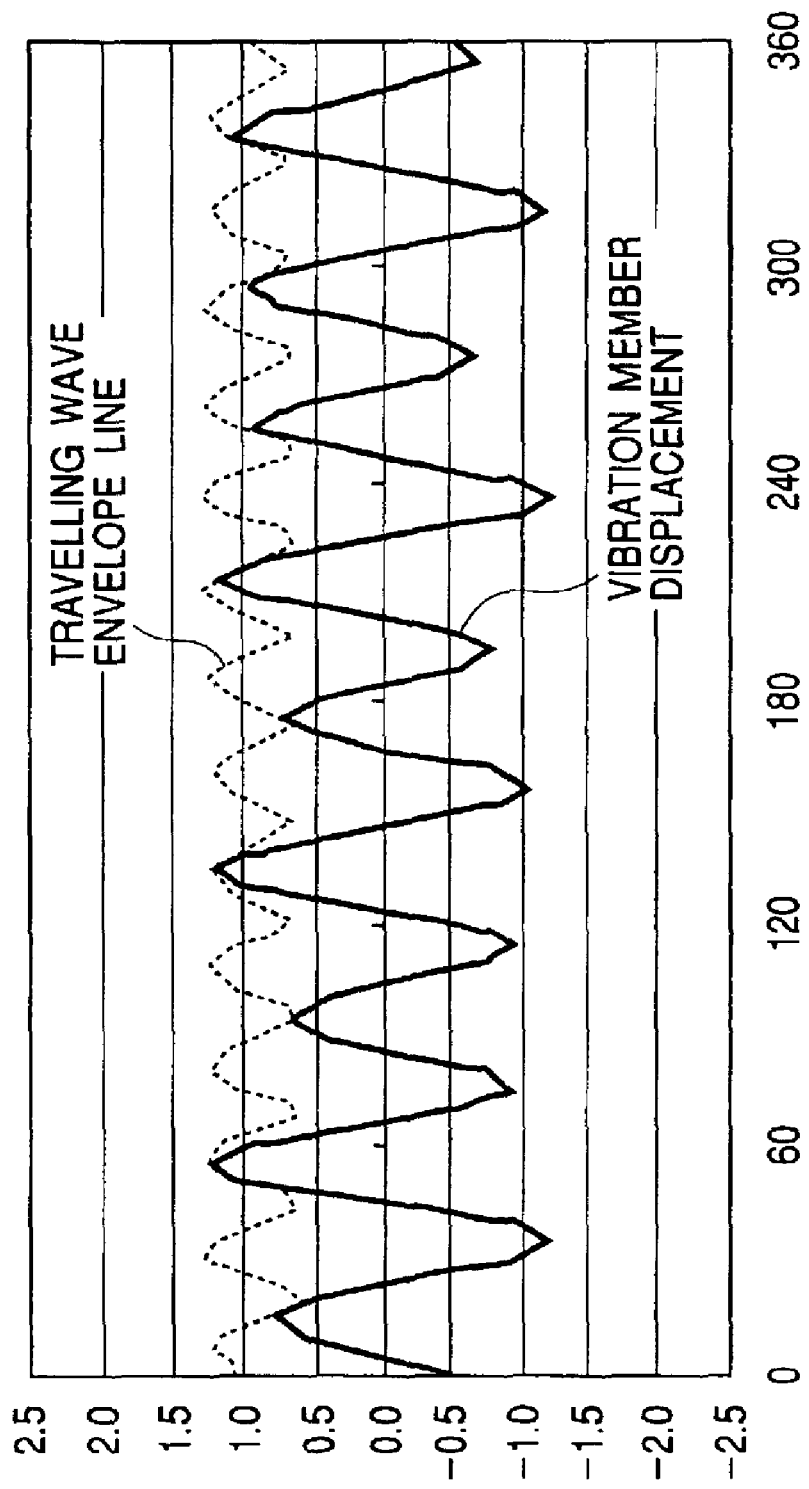
FIG. 24 is a chart showing an amplitude distribution superimposed with a torsion mode.

FIG. 13 is a perspective view of a vibration member in a vibration wave motor according to an eighth embodiment of the present invention, and FIG. 14 a sectional view of FIG. 13.

The vibration member in this embodiment is one in the torsional vibration type vibration wave motor using the torsional vibration of the ring part 1A of the elastic member 1 for the driving vibration.

When the driving voltages are applied to the piezoelectric element 2 fixed to the back surface of the support circular plate part 1B, the exciting force of bending the support circular plate part 1B is produced. Bending of the support circular plate part 1B generates the exciting force of deformation of the ring part 1A to produce a torsion mode in the ring part 1A.

If at this time the natural frequency of the bending vibration in the axial direction of the ring part 1A is present in the driving frequency band of the torsion mode, there is a concern that the exciting force of the driving frequency due to the unevenness in the sliding part can give rise to unwanted bending vibration as forced vibration.

In the present embodiment, therefore, the natural frequency of bending vibration is set outside the frequency band of the torsion mode by a technique similar to those in the embodiments described above. Furthermore, the response component of the unwanted mode can be reduced by making the driving frequency band include a region where the response amplitudes in excitation in the sliding part of the vibration member are equal.

What is claimed is:

1. A vibration wave driving apparatus comprising:
   a vibration member comprising an electro-mechanical energy conversion element and an elastic member to which the electro-mechanical energy conversion element is fixed; and
   a contact member pressed against the vibration member so as to be kept in contact therewith,
   wherein alternating signals are supplied in a predetermined driving frequency band to the electro-mechanical energy conversion element, thereby generating a driving vibration for the vibration member to move the contact member and generating another vibration for the vibration member, and
   wherein a natural frequency of the other vibration, generated on the vibration member and different from the driving vibration, is not included in the driving frequency band.

2. The vibration wave driving apparatus according to claim 1, wherein in the vibration member is operable in a mode of generating another vibration, generated on the vibration member, having a natural frequency in a frequency band higher than the driving frequency band and a mode of generating another vibration, generated on the vibration member, having a natural frequency in a frequency band lower than the driving frequency band, and
   wherein the driving frequency band includes a frequency at which a frequency response gain to excitation at the contact member in the mode of generating the other vibration, generated on the vibration member, having the natural frequency in the frequency band higher than the driving frequency band is equal to that in the mode of generating the other vibration, generated on the vibration member, having the natural frequency in the frequency band lower than the driving frequency band.

3. The vibration wave driving apparatus according to claim 1, wherein the elastic member comprises a ring-shaped vibration part, a fixed part for attaching the elastic member to another member, and a support part for coupling the vibration part to the fixed part, and wherein a stiffness of the support part on the fixed part side is different from that on the vibration part side.

4. The vibration wave driving apparatus according to claim 1, wherein the elastic member comprises a ring-shaped vibration part, a fixed part for attaching the elastic member to another member, and a support part for coupling the vibration part to the fixed part, and wherein a stiffness of a portion of the support part with a greater strain than that of another portion in the other vibration, generated on the vibration member, is different from a stiffness of the other portion of the support part.

5. The vibration wave driving apparatus according to claim 1, wherein the elastic member comprises a ring-shaped vibration part in contact with the contact member and wherein the vibration part is fixed to a plurality of ring-shaped support members.

6. The vibration wave driving apparatus according to claim 1, wherein the elastic member comprises a ring-shaped vibration part in contact with the contact member and wherein the vibration part is fixed to a ring-shaped support member of a width narrower than the vibration part.

7. The vibration wave driving apparatus according to claim 1, wherein the elastic member comprises a ring-shaped vibration part in contact with the contact member and wherein the other vibration, generated on the vibration member, is a torsional vibration of twisting the vibration part with respect to an axis on a circle concentric with the vibration part.

8. The vibration wave driving apparatus according to claim 7, wherein a resultant force of a frictional force between the vibration part and the contact member and a pressing force of pressing the contact member acts on a sliding part where the vibration member is in contact with the contact member, and an axis of the torsional vibration is located on an extension of the resultant force acting on the sliding part.

9. The vibration wave driving apparatus according to claim 1, wherein a natural frequency of a first-order mode of the other vibration, generated on the vibration member, is set in a band higher than the driving frequency band.

10. A vibration wave driving apparatus comprising:
    a vibration member comprising an elastic member to which an electro-mechanical energy conversion element is fixed;
    a contact member kept in contact with the vibration member; and
    a frequency adjusting member which supports the elastic member,
    wherein alternating signals are supplied in a predetermined driving frequency band to the electro-mechanical energy conversion element, thereby generating a driving vibration for the vibration member to move the contact member and generating another vibration for the vibration member, and
    wherein the frequency adjusting member had such a form that the other vibration does not become a natural frequency in a case of supplying the alternating signals in the predetermined driving frequency band to the electro-mechanical energy conversion element.

11. The vibration wave driving apparatus according to claim 10, wherein in the vibration member is operable in a mode having a natural frequency in a frequency band higher than the driving frequency band and a mode having a natural frequency in a frequency band lower than the driving frequency band, and
    wherein the frequency adjusting member has such a form that a first frequency response gain of the vibration for the contact member, in a first mode in which another vibration generated on the vibration member has a natural frequency in a frequency band higher than the driving frequency band, is equal to a second frequency response gain of the vibration for the contact member, in a second mode in which another vibration generated on the vibration member has a natural frequency in a frequency band lower than the driving frequency band.

12. The vibration wave driving apparatus according to claim 10, wherein the elastic member is of a ring shape and the frequency adjusting member supports an internal region of the elastic member, and
    wherein the frequency adjusting member is formed so that a stiffness of a portion with greater strain in the other vibration, generated on the vibration member, is different from that of another portion.

13. The vibration wave driving apparatus according to claim 10, wherein the elastic member comprises a ring-shaped vibration part in contact with the contact member and wherein the frequency adjusting member secures the vibration part with a plurality of ring-shaped support members.

14. The vibration wave driving apparatus according to claim 10, wherein the elastic member comprises a ring-shaped vibration part in contact with the contact member and wherein the frequency adjusting member secures the vibration part with a ring-shaped support member of a width narrower than the vibration part.

15. The vibration wave driving apparatus according to claim 10, wherein the elastic member comprises a ring-shaped vibration part in contact with the contact member, and wherein the other vibration is a torsional vibration of twisting the vibration part with respect to an axis on a circle concentric with the vibration part.

\* \* \* \* \*

UNITED STATES PATENT AND TRADEMARK OFFICE
CERTIFICATE OF CORRECTION

PATENT NO. : 7,245,058 B2  Page 1 of 1
APPLICATION NO. : 10/307926
DATED : July 17, 2007
INVENTOR(S) : Fujimoto et al.

It is certified that error appears in the above-identified patent and that said Letters Patent is hereby corrected as shown below:

ON THE TITLE PAGE:
At Item (56), References Cited, Foreign Patent Documents, "JP 09215348 * 9/1997" should be deleted.

IN THE DRAWINGS:
Sheet No. 3, Figure 6, "INTERAL" should read --INTERNAL--.

COLUMN 2:
Line 58, "thereof This" should read --thereof. This--.

COLUMN 3:
Line 64, "being-uneven," should read --being uneven,--.

COLUMN 6:
Line 1, "ringshaped" should read --ring-shaped--.

COLUMN 11:
Line 26, "wherein in" should read --wherein--.

COLUMN 12:
Line 39, "wherein in" should read --wherein--.

Signed and Sealed this

Twenty-first Day of April, 2009

JOHN DOLL
*Acting Director of the United States Patent and Trademark Office*